United States Patent
Soroker et al.

(10) Patent No.: US 7,726,799 B2
(45) Date of Patent: Jun. 1, 2010

(54) PIGMENT-BASED NON-AQUEOUS INK-JET INKS FREE OF HAZARDOUS AIR POLLUTING SOLVENTS

(75) Inventors: Efrat Soroker, Zur Moshe (IL); Richard Power, Clifton (ZA); Eytan Cohen, Raanana (IL); James Lowndes, Constancia (ZA); Amir Shapira, Herzlia (IL); Benjamin Dayan, Tel-Aviv (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 252 days.

(21) Appl. No.: 11/490,574

(22) Filed: Jul. 21, 2006

(65) Prior Publication Data
US 2008/0018676 A1    Jan. 24, 2008

(51) Int. Cl.
*G01D 11/00* (2006.01)
(52) U.S. Cl. .......................... 347/100; 347/95; 523/160; 106/31.6
(58) Field of Classification Search ................. 347/100, 347/95, 96, 101; 106/31.6, 31.13, 31.27; 523/160
See application file for complete search history.

(56) References Cited

U.S. PATENT DOCUMENTS

| 5,076,843 | A | 12/1991 | Acitelli et al. |
| 5,275,646 | A | 1/1994 | Marshall et al. |
| 5,776,237 | A | 7/1998 | Tomiya et al. |
| 5,942,028 | A | 8/1999 | Tomiya et al. |
| 5,952,048 | A | 9/1999 | Tsubuko et al. |
| 6,350,795 | B1 | 2/2002 | Breton et al. |
| 6,379,444 | B1 | 4/2002 | Dastas et al. |
| 6,730,714 | B2 | 5/2004 | Ylitalo et al. |
| 2004/0191521 | A1* | 9/2004 | Weiss et al. .............. 428/411.1 |
| 2004/0249088 | A1* | 12/2004 | Hees et al. .................. 525/453 |
| 2004/0266912 | A1 | 12/2004 | Aida et al. |
| 2005/0032932 | A1* | 2/2005 | Salenbien ................... 523/160 |
| 2005/0134664 | A1* | 6/2005 | Pavlin ........................ 347/100 |

FOREIGN PATENT DOCUMENTS

| EP | 0921165 | 6/1999 |
| EP | 1061419 | 12/2000 |
| EP | 1491597 | 12/2004 |
| JP | 2004-035597 | * 2/2004 |
| WO | WO 99/51690 | 10/1999 |
| WO | WO 2004/018197 | 3/2004 |

* cited by examiner

*Primary Examiner*—Manish S Shah

(57) ABSTRACT

The present invention is drawn to ink compositions and methods for ink-jet recording. The ink compositions can include a non-aqueous HAPS-free solvent system; a binder system, including at least one of i) an acrylic resin, or ii) a first vinyl chloride-vinyl acetate resin, which is at least substantially soluble in the solvent system; and a pigment milled in the presence of a second vinyl chloride-vinyl acetate resin. Further, at least one solvent of the solvent system can serve as a dispersing and diluent solvent for the pigment.

47 Claims, No Drawings

PIGMENT-BASED NON-AQUEOUS INK-JET INKS FREE OF HAZARDOUS AIR POLLUTING SOLVENTS

BACKGROUND OF THE INVENTION

The ink-jet printing industry uses different types of recording fluids such as oil-based inks, solvent-based (non-aqueous) inks, water-based inks, and solid inks (which are melted in preparation for dispensing). Solvent-based inks are fast drying, and as a result, are widely used for industrial printing. When solvent-based inks containing binders and other ingredients are jetted onto a substrate, the solvent(s) partially or fully evaporate from the ink, leaving the binder and other ingredients such as pigment particles on the printed substrate in the form of a dry film.

During the drying process, the solvents, which are often volatile organic compounds (VOC), emit vapors, and therefore, can pollute the environment. The pollution problem becomes more critical for higher printing speeds or for wide format images, where large amounts of ink are deposited onto a substrate. Thus, it would be valuable to provide a non-aqueous solvent-based ink that does not pollute the environment, but still performs acceptably compared to other more traditional inks.

DETAILED DESCRIPTION OF THE PREFERRED EMBODIMENT(S)

Reference will now be made to exemplary embodiments, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art having possession of this disclosure, are to be considered within the scope of the present invention.

In describing and claiming the present invention, the following terminology will be used in accordance with the definitions set forth below.

The singular forms "a," "an," and "the" include plural referents unless the context clearly dictates otherwise. Thus, for example, reference to "a pigment" includes one or more of such materials, unless the context clearly dictates otherwise.

The term "Hazardous Air Pollutants" or "HAPs" is a broad term applied to any chemical, physical (e.g. particulate matter), or biological agent that releases environmental contaminants negatively modifying the natural characteristics of the atmosphere. Accordingly, non-HAPs are materials that do not release environmental contaminants modifying the natural characteristics of the atmosphere. The U.S. Environmental Protection Agency (EPA) has published a list of hazardous air pollutants (HAPs), which is found in the Clean Air Act 112(b) (as amended 1990). These solvents are known to be air pollutants. Typically, commercially available solvent-based inks are based on solvents included in the hazardous air polluting solvents list, or contain other solvents that are air polluting. It is emphasized that none of these listed solvents can be present in the ink-jet inks of the present invention, which are listed as follows: Acetaldehyde, Acetamide, Acetonitrile, Acetophenone, 2-Acetylaminofluorene, Acrolein, Acrylamide, Acrylic acid, Acrylonitrile, Allyl chloride, 4-Aminobiphenyl, Aniline, o-Anisidine, Asbestos, Benzene (including benzene from gasoline), Benzidine, Benzotrichloride, Benzyl chloride, Biphenyl, Bis(2-ethylhexyl)phthalate (DEHP), Bis(chloromethyl)ether, Bromoform, 1,3-Butadiene, Calcium cyanamide, Caprolactam (including modifications), Captan, Carbaryl, Carbon disulfide, Carbon tetrachloride, Carbonyl sulfide, Catechol, Chloramben, Chlordane, Chlorine, Chloroacetic acid, 2-Chloroacetophenone, Chlorobenzene, Chlorobenzilate, Chloroform, Chloromethyl methyl ether, Chloroprene, Cresols/Cresylic acid (isomers and mixture), o-Cresol, m-Cresol, p-Cresol, Cumene, 2,4-D, salts and esters, DDE, Diazomethane, Dibenzofurans, 1,2-Dibromo-3-chloropropane, Dibutylphthalate, 1,4-Dichlorobenzene(p), 3,3-Dichlorobenzidene, Dichloroethyl ether (Bis(2-chloroethyl)ether), 1,3-Dichloropropene, Dichlorvos, Diethanolamine, N,N-Diethyl aniline (N,N-Dimethylaniline), Diethyl sulfate, 3,3-Dimethoxybenzidine, Dimethyl aminoazobenzene, 3,3'-Dimethyl benzidine, Dimethyl carbamoyl chloride, Dimethyl formamide, 1,1-Dimethyl hydrazine, Dimethyl phthalate, Dimethyl sulfate, 4,6-Dinitro-o-cresol, and salts, 2,4-Dinitrophenol, 2,4-Dinitrotoluene, 1,4-Dioxane (1,4-Diethyleneoxide), 1,2-Diphenylhydrazine, Epichlorohydrin (1-Chloro-2,3-epoxypropane), 1,2-Epoxybutane, Ethyl acrylate, Ethyl benzene, Ethyl carbamate (Urethane), Ethyl chloride (Chloroethane), Ethylene dibromide (Dibromoethane), Ethylene dichloride (1,2-Dichloroethane), Ethylene glycol, Ethylene imine(Aziridine), Ethylene oxide, Ethylene thiourea, Ethylidene dichloride (1,1-Dichloroethane), Formaldehyde, Heptachlor, Hexachlorobenzene, Hexachlorobutadiene, Hexachlorocyclopentadiene, Hexachloroethane, Hexamethylene-1,6-diisocyanate, Hexamethylphosphoramide, Hexane, Hydrazine, Hydrochloric acid, Hydrogen fluoride (Hydrofluoric acid), Hydrogen sulfide (including modification), Hydroquinone, Isophorone, Lindane (all isomers), Maleic anhydride, Methanol, Methoxychlor, Methyl bromide (Bromomethane), Methyl chloride (Chloromethane), Methyl chloroform (1,1,1-Trichloroethane), Methyl ethyl ketone (2-Butanone) (including modification), Methyl hydrazine, Methyl iodide (Iodomethane), Methyl isobutyl ketone (Hexone), Methyl isocyanate, Methyl methacrylate, Methyl tert butyl ether, 4,4-Methylene bis(2-chloroaniline), Methylene chloride (Dichloromethane), Methylene diphenyl diisocyanate (MDI), 4,4-Methylenedianiline, Naphthalene, Nitrobenzene, 4-Nitrobiphenyl, 4-Nitrophenol, 2-Nitropropane, N-Nitroso-N-methylurea, N-Nitrosodimethylamine, N-Nitrosomorpholine, Parathion, Pentachloronitrobenzene (Quintobenzene), Pentachlorophenol, Phenol, p-Phenylenediamine, Phosgene, Phosphine, Phosphorus, Phthalic anhydride, Polychlorinated biphenyls (Aroclors), 1,3-Propane sultone, beta-Propiolactone, Propionaldehyde, Propoxur (Baygon), Propylene dichloride (1,2-Dichloropropane), Propylene oxide, 1,2-Propylenimine(2-Methyl aziridine), Quinoline, Quinone, Styrene, Styrene oxide, 2,3,7,8-Tetrachlorodibenzo-p-dioxin, 1,1,2,2-Tetrachloroethane, Tetrachloroethylene (Perchloroethylene), Titanium tetrachloride, Toluene, 2,4-Toluene diamine, 2,4-Toluene diisocyanate, o-Toluidine, Toxaphene (chlorinated camphene), 1,2,4-Trichlorobenzene, 1,1,2-Trichloroethane, Trichloroethylene, 2,4,5-Trichlorophenol, 2,4,6-Trichlorophenol, Triethylamine, Trifluralin, 2,2,4-Trimethylpentane, Vinyl acetate, Vinyl bromide, Vinyl chloride, Vinylidene chloride (1,1-Dichloroethylene), Xylenes (isomers and mixture), o-Xylenes, m-Xylenes, p-Xylenes, Antimony Compounds, Arsenic Compounds (inorganic including arsine), Beryllium Compounds, Cadmium Compounds, Chromium Compounds, Cobalt Compounds, Cyanide Compounds (including XCN where X=H or any other group where a formal dissociation may occur. For example KCN or Ca(CN)$_2$), Glycol ethers (including mono- and di-ethers of ethylene glycol, diethylene glycol, and triethylene glycol); R—(OCH$_2$CH$_2$)$_n$—OR' where n=1, 2, or 3; R=alkyl or aryl groups; and R'=R, H, or groups which, when removed, yield glycol ethers with the structure: R—(OCH$_2$CH)$_n$—OH— (Polymers are excluded from the glycol category), Lead Compounds, Manganese Compounds, Mercury Compounds, Fine mineral fibers (including mineral fiber emissions from facilities manufacturing or processing glass, rock, or slag fibers (or other mineral derived fibers) of average diameter 1 micrometer or less), Nickel Compounds, Polycylic Organic Matter (including organic compounds with more than one benzene ring, and which have a boiling point greater than or equal to 100° C.), Radionuclides (including radon and other materials that spontaneously undergo radioactive decay), and Selenium Compounds. For all listings above which contain the word "compounds" and for glycol ethers, the following applies: Unless otherwise specified, these listings are defined as including any unique chemical substance that contains the named chemical (e.g., antimony, arsenic, etc.) as part of that chemical's infrastructure. It is noted that HAPs compounds can include compounds other than those listed above, as may be shown by independent testing, or as the list is expanded over a period of time.

The term "spot color" relates to colors that are difficult to reproduce by combining the four traditional process inks (cyan, magenta, yellow, and black). Examples include pink, orange, green, etc., and these inks are often printed using a single ink or a combination of inks using at least one spot color.

The term "solvent-based" when referring to inks of the present invention are non-aqueous inks that include solvent(s) (other than water), binder(s), and colorant.

The term "system" when referring to a "solvent system" or a "binder system" does not indicate that multiple materials are present. A single solvent can be a system, and a single binder can be a system. Often, however, multiple solvents or multiple binders are present in a "system."

As used herein, a plurality of items, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Numerical values, such as ratios, concentrations, amounts, molecular sizes, etc., may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of about 1 wt % to about 20 wt % should be interpreted to include not only the explicitly recited concentration limits of 1 wt % to about 20 wt %, but also to include individual concentrations such as 2 wt %, 3 wt %, 4 wt %, and sub-ranges such as 5 wt % to 15 wt %, 10 wt % to 20 wt %, etc.

Aspects of the present invention are directed to ink compositions and related methods. It is noted that compositions and methods of the present invention share certain commonalities and characteristics. Some of these characteristics will be discussed in the context of the compositions, and others will be described in the context of the methods. It should be noted that regardless of where discussed, each of the following descriptions applies generally to the compositions and methods of the present invention. Further, in the following detailed description, numerous specific details are set forth in order to provide a thorough understanding of the ink. However, it will be understood by those of ordinary skill in the art that the present ink may be practiced without these specific details. In other instances, well-known methods, procedures, formulation and compositions have not been described in detail so as not to obscure the nature of the present ink.

In accordance with embodiments of the present invention, an ink composition for ink-jet recording can comprise a non-aqueous HAPS-free solvent system; a binder system, including at least one of i) an acrylic resin, or ii) a vinyl chloride-vinyl acetate resin, which binder system is at least substantially soluble in the solvent system; and a pigment milled in presence of a vinyl chloride-vinyl acetate resin. In at least one embodiment of the vinyl chloride-vinyl acetate resin, the resin includes from 0.1 wt % to 2 wt % of dicarbonic acid. At least one solvent of the solvent system can serve as a dispersing and diluent solvent for the ink composition. In another embodiment, a method of printing an image can comprise ink-jetting the above-described ink composition onto a media substrate.

The relative amounts of different components of the ink-jet inks can vary. For example, the binder system as a whole can be present at from 1% wt % to about 50 wt % and preferably from 5% to about 40 wt % and more preferably from 8% to about 30 wt %. Further, the solvent system can be present as a whole in the ink at from 2 wt % to 90 wt % and preferably from 5% to about 70 wt % and more preferably from 10% to about 50 wt %. The amount of binder system versus the amount of solvent system can be determined by various factors, such as viscosity, molecular weight, glass transition temperature and others. Thus, more solvent and less binder will form an ink that has a lower viscosity, whereas more binder and less solvent will form an ink that has a higher viscosity As also mentioned, the ink compositions include colorants, including at least some pigment milled in a vinyl chloride-vinyl acetate. Other pigments and/or dyes can also be present. Appropriate amounts of pigments and other colorants that can be present range from 2 wt % to 20 wt %. In addition to the pigment, binder, and solvent, the composition can also include other additives, such as surfactants or wetting agents, dispersants, leveling agents, preservatives, anti-molding agents, storage stability enhancing agents, and the like. Regarding these additives, typically, they are present in minor amounts. For example, a solvent soluble or dispersible dispersant(s) can be present at from 0.5 wt % to 5 wt %.

In accordance with embodiments of the present invention, the ink-jet inks can possess good adhesion properties, which can adhere to a wide range of substrates. Exemplary substrates that can be used with these inks include absorbing materials such as papers, coated papers, absorbing plastics and vinyls, etc., as well as non-absorbing materials such as non-absorbing plastics, glass, and metals.

In further detail with respect to certain materials that can be used in the inks of the present invention, binders and resins, solvents, pigments, and additives are described in greater detail.

Binder System

Non-limiting examples of solvent-soluble resins that can be used include acrylic resins available commercially from ROHM & HAAS Company, Philadelphia, Pa. 19106 U.S.A. under the names Paraloid Acrylic resins as follows: A-11, A-12, A-101, A-10S, A-646, B-60, B-64, B-66, B-66T, B-66X, B-72, B-82, A-21, A-21 LV, B-44, B-44S, B-48N, B-48S, B-84, B-67, B-99N, XR-34, B-1225, DM-55, M-825, NAD-10V, and F-10. Other solvent-soluble resins that can be used include copolymers of vinyl chloride-vinyl acetate with and without functional groups, e.g., carboxyl and/or hydroxyl groups, including esters thereof, e.g., vinyl acetate esters. Some of these polymers are available commercially from WACKER Polymers GmbH, Burghausen D-84489 Germany under the names Vinnol Resins as follows: H 15/45, H 14/36, H 15/42, H 15/50, H 11/59, H 40/43, H 40/50, H 40/55, and H 40/60. Other Non-limiting examples of functionalized solvent-soluble resins that can be used are available commercially from WACKER Polymers GmbH under the names E 15/45M, H 15/45M, E 15/40A, E 15/48A, and E 22/48A. It is noted that in some embodiments, only acrylic resins are present as the binder system, in some embodiments, only vinyl chloride-vinyl acetate resins are present as the binder system, and in still other embodiments, both types of resins can be present.

Solvent System

The solvent system of the present invention typically includes a mixture of multiple solvents. Glycol ether solvents are non-limiting examples of solvents that are acceptable for use, which can include Ethylene Glycol Mono-butyl Ether (EGBE), Tripropylene glycol mono methyl ether, Propylene glycol methyl ether, Propylene glycol ethyl ether, Propylene glycol butyl ether, Dipropylene glycol mono methyl ether, Dipropylene glycol ethyl ether, Dipropylene glycol butyl ether, Propylene glycol n-propyl ether, Dipropylene glycol n-propyl ether, Tripropylene glycol n-propyl ether, Propylene glycol n-butyl ether, Dipropylene glycol n-butyl ether, Tripropylene glycol n-butyl ether, Dipropylene glycol dimethyl ether (Proglyme). Esters and Glycol ether acetate such as Propylene carbonate, Butyl glycolate, Propylene glycol methyl ether acetate, Ethyl Lactate, Butyl Lactate, N-Propyl S-Lactate and Ethylhexyl-S-Lactate, Dipropylene glycol methyl ether acetate, and Propylene glycol diacetate can also be used. Further, ketones such as Butyrolactone, Diiso butyl ketone, and Cyclohexanone are also desirable for use. It is noteworthy that none of the above-listed solvents are included in the list of hazardous air polluting solvents released by the US Environmental Protection Agency (EPA). In one embodiment, N-ethyl-2-pyrrolidone can be included for improving adhesion of the ink composition to a substrate.

Pigments

It is noted that an aspect of the present invention includes milling pigments in a vinyl chloride-vinyl acetate species, such as Vinnol resins, for example. This has the benefit of improving pigment wettability and/or lowering millbase viscosity. Optionally, other solvents can also be present when milling the pigments in preparation for inclusion in the ink composition, such as glycol ethers. For example, a mixture of a vinyl chloride-vinyl acetate resin and dipropylene glycol mono methyl ether acetate, or N-propyl-S-lactate and ethylhexyl-S-lactate that provide an acceptable "odor option" and "EHS" (Environmental Health and Safety) option is desirable for pigment milling. N-propyl-S-lactate and ethylhexyl-S-lactate solvents are of particular interest since they are made from corn and/or other renewable resources.

Non-limiting examples of pigments that can be used in accordance with embodiments of the present invention include yellow pigments having the following Yellow Pigment color index PY 83, PY 151, PY 150, and PY 154. Magenta pigments composed of Red pigment having color indices of PR 202, PR 254 and PR 122 and Violet pigment having color indices of PV 19, PV 23 and PV 29 can also be used. Blue pigments having color indices of PB 15:3, 15:4, 15:2, and 15:1, as well as black pigments having color indices of PBL Black 7 are also useable.

Examples of other pigments that can be used include so called "spot color pigments," which are pigments that are of a color other than cyan, magenta, yellow, or black, and which are difficult to reproduce by mixing colors. Specific spot color pigments that can be used include Cromophtal Orange GL (PO-64) or Microlith Green G-K (PG 7), both available from Ciba Company, Basel CH-4002 Switzerland.

Other Additives

Non-limiting examples of other additives that can be used include surfactants or wetting agents, slip components, dispersants, leveling agents, preservatives, anti-molding agents, storage stability enhancing agents, and the like.

The dispersant(s), if added, can comprise one or more solvent-soluble or solvent dispersible components. Non-limiting examples of dispersants can include high molecular weight copolymers with pigment affinic groups, including block copolymers. Specific examples of dispersants include those commercially available from BYK Chemie GmbH, Postfach 100245 Wesel D-46462 Germany under the names Disperbyk-115, Disperbyk-160, Disperbyk-161, Disperbyk-162, Disperbyk-163, Disperbyk-164, Disperbyk-166, Disperbyk-167, Disperbyk-169, Disperbyk-182, Disperbyk-174 and Disperbyk 184.

The surfactant(s), if added can be anionic, cationic, non-ionic, amphoteric, silicon-free, fluorosurfactants, polysiloxanes, etc. In one embodiment, the surfactant can be a polyether siloxane copolymer surfactant. More specific examples of such materials include surfactants available commercially from Tego Chemie Service GmbH 100 Goldschmidtstrasse, Essen D-45127 Germany, to improve substrate wetting under the names Wet ZFS 453, Glide 415, Glide 100, Glide 450 and Glide 410 or Leveling agents, under the name Glide A 115, Flow 300, Glide 420, Glide 406, Glide 411, Glide 435 and Glide 440.

Slip component(s), if added, that can be used include organically modified siloxanes available commercially from EFKA Company, Heerenveen 8440 AN the Netherlands under the names EFKA-7310, EFKA-7311, EFKA-7315 and EFKA-7375.

EXAMPLES

The following examples illustrate the embodiments of the invention that are presently best known. However, it is to be understood that the following are only exemplary or illustrative of the application of the principles of the present invention. Numerous modifications and alternative compositions, methods, and systems may be devised by those skilled in the art without departing from the spirit and scope of the present invention. The appended claims are intended to cover such modifications and arrangements. Thus, while the present invention has been described above with particularity, the following examples provide further detail in connection with what are presently deemed to be the most practical and preferred embodiments of the invention. It is also noted that in the following examples, all the examples are prepared in a similar manner to that described in Example 1.

Example 1

Yellow Pigment Dispersion

A yellow pigment dispersion is prepared in accordance with Table 1 below by adding Vinnol E15/45 to DPMA until it dissolves in the DPMA. Next, the pigment Y 151 is added as a powder and the entire composition is milled for approximately two hours or more until it becomes a homogenous dispersion.

TABLE 1

| Ingredient | Weight % |
| --- | --- |
| DPMA (Dipropylene glycol mono methyl ether acetate) | 70-80 |
| Vinnol E15/45 (Vinyl chloride-vinyl acetate resin) | 10-15 |
| Pigment Yellow 151 | 10-15 |

Example 2

Yellow Ink Composition

A yellow ink composition is prepared in accordance with Table 2 below by adding 25% Paraloid B-66 to DPMA, mixing, and then adding Disperbyk D-167 dispersant and mixing until dissolved. The yellow pigment dispersion of Example 1 is then added and mixed for approximately one hour. The Glide 415 is continually mixed into the composition for approximately 15 minutes, and the MPA is also added for dilution and viscosity control.

TABLE 2

| Ingredient | Weight % |
| --- | --- |
| MPA (Propylene glycol methyl ether acetate) | 15-25 |
| DPMA (Dipropylene glycol mono methyl ether acetate) | 40-45 |
| Yellow pigment dispersion of Example 1 | 25-35 |
| Disperbyk D-167 (Dispersant) | 2-4 |
| Glide 415 (Surfactant) | 0.01-0.03 |
| 25% Paraloid B-66 (Copolymer of methyl methacrylate and butyl methacrylate) in DPMA | 3-7 |

The ink prepared in accordance with this example was applied (18 micron thickness) on various substrates such as vinyl, PVC, papers, and other plastics. The ink was heated to about 80° C. for about 40 seconds to evaporate solvent. The dried film showed good mechanical properties on these substrates. Further, this yellow ink composition has been jetted from a piezoelectric print head manufactured by Scitex Vision Ltd. of Netanya, Israel and jetting properties were tested. No clogging of print-head nozzles was observed, and no misdirected ink was detected even after long periods of continuous printing. It is noted that this yellow ink composition is also jettable from other print heads, including, for example, GEN-2 print heads manufactured by Ricoh Co., Ltd., Tokyo, Japan.

Example 3

Magenta Pigment Dispersion

A magenta pigment dispersion is prepared in accordance with Table 3 below by adding Vinnol E15/45 resin to DPMA and mixing until it dissolves in the solvent. Next, Pigment Red 202 and Pigment Red 254 powders are added and the product is milled for approximately two hours or more until it becomes a homogenous dispersion.

TABLE 3

| Ingredient | Weight % |
| --- | --- |
| DPMA (Dipropylene glycol mono methyl ether acetate) | 74-82 |
| Vinnol E15/45 (Vinyl chloride-vinyl acetate resin) | 8-11 |
| Pigment Red 202 | 9-12 |
| Pigment Red 254 | 1-3 |

Example 4

Magenta Ink Composition

A magenta ink composition is prepared in accordance with Table 4 by adding 25% Paraloid B-66 to DPMA solvent and mixing, followed by adding D-167 dispersant and mixing until dissolved. To this composition is added the magenta pigment dispersion of Example 3, which is mixed for approximately one hour. Glide 415 is added and continuously mixed for approximately 15 minutes, and MPA is added for dilution and viscosity control.

TABLE 4

| Ingredient | Weight % |
| --- | --- |
| MPA (Propylene giycol methyl ether acetate) | 15-25 |
| Magenta pigment dispersion of Example 3 | 25-35 |
| DPMA (Dipropylene glycol mono methyl ether acetate) | 35-45 |
| Disperbyk D167 (Dispersant) | 1.5-4.5 |
| Glide 415 (Surfactant) | 0.01-0.03 |
| 25% Paraloid B-66 (Copolymer of methyl methacrylate and butyl methacrylate) in DPMA | 5-11 |

The ink prepared in accordance with this example was applied (18 micron thickness) on various substrates such as vinyl, PVC, papers, and other plastics.

The ink was heated to about 80° C. for about 30 seconds to evaporate solvent.

The dried film showed good mechanical properties on these substrates. Further, this magenta ink composition has been jetted from a piezoelectric print head manufactured by Scitex Vision Ltd. of Netanya, Israel and jetting properties were tested. No clogging of print-head nozzles was observed, and no misdirected ink was detected even after long periods of continuous printing. It is noted that this magenta ink composition is also jettable from other print heads, including, for example, GEN-2 print heads manufactured by Ricoh Co., Ltd., Tokyo, Japan.

Example 5

Cyan Pigment Dispersion

A cyan pigment dispersion is prepared in accordance with Table 5 by adding Vinnol E15/45 to DPMA and mixing it until dissolved, followed by adding pigment Blue 15.3 powder and milling for approximately two hours or more until it becomes a homogenous dispersion.

TABLE 5

| Ingredient | Weight % |
| --- | --- |
| DPMA (Dipropylene glycol mono methyl ether acetate) | 70-75 |
| Vinnol E15/45 (Vinyl chloride-vinyl acetate resin) | 10-16 |
| Pigment Blue 15:3 | 10-16 |

Example 6

Cyan Ink Composition 1

A cyan ink composition is prepared in accordance with Table 6 by adding 25% Paraloid B-66 to DPMA solvent and mixing, followed by adding the Disperbyk D-167 dispersant and mixing until dissolved. The cyan pigment dispersion of Example 5 is added and mixed for approximately one hour, and Glide 415 is added with continuous mixing for approximately 15 minutes. MPA is then added for dilution and viscosity control.

TABLE 6

| Ingredient | Weight % |
| --- | --- |
| MPA (Propylene glycol methyl ether acetate) | 15-25 |
| DPMA (Dipropylene glycol mono methyl ether acetate) | 35-45 |
| Cyan pigment dispersion of Example 5 | 15-25 |
| Disperbyk D167 (Dispersant) | 0.5-1.5 |
| Glide 415 (Surfactant) | 0.15-0.30 |
| 25% Paraloid B-66 (Copolymer of methyl methacrylate and butyl methacrylate) in DPMA | 15-20 |

Example 7

Cyan Ink Composition 2

A cyan ink composition is prepared in accordance with Table 7 by adding 15% Vinnol E15/45 in DPMA solvent and mixing it, adding 20% M825 to the DPMA solvent and mixing, followed by adding D167 dispersant and mixing until dissolved. The cyan pigment dispersion of Example 5 is mixed for approximately one hour. The butyrolactone is added under continuing mixing for approximately 15 minutes, followed by the addition of the Proglyme for dilution and vinyl etching.

TABLE 7

| Ingredient | Weight % |
| --- | --- |
| DPMA (Dipropylene glycol mono methyl ether acetate) | 24-32 |
| Butyrolactone | 3-7 |
| Proglyme (Dipropylene glycol dimethyl ether) | 25-35 |
| Cyan pigment dispersion of Example 5 | 20-26 |
| Disperbyk D167 (Dispersant) | 1-3 |
| 15% Vinnol E15/45 (Vinyl chloride-vinyl acetate resin) in DPMA | 3-20 |
| 20% Degalan M825 (Acrylic polymer on the basis of methyl methacrylate) in DPMA | 0.3-6.0 |

The inks prepared in accordance with Example 6 and this example were each applied (40 micron thickness) on various substrates such as vinyl, PVC, papers, and other plastics. The ink was heated to about 80° C. for about 40 seconds to evaporate solvent. The dried film showed good mechanical properties on these substrates. Further, this cyan ink composition has been jetted from a piezoelectric print head manufactured by Scitex Vision Ltd. of Netanya, Israel and jetting properties were tested. No clogging of print-head nozzles was observed, and no misdirected ink was detected even after long periods of continuous printing. It is noted that this cyan ink compositions are also jettable from other print heads, including, for example, GEN-2 print heads manufactured by Ricoh Co., Ltd., Tokyo, Japan.

Example 8

Black Ink Composition

A black ink is prepared in accordance with Table 8 by adding DPMA to Paraloid B-66 and mixing until dissolved, followed by adding Disperbyk 167. Next, Pigment Black 7 (previously milled with Vinnol E15/45) pigment dispersion is then mixed therein for approximately two hours or more until it becomes a homogenous dispersion. Glide 415 is added under continuing mixing for approximately 15 minutes and MPA is added for dilution and viscosity control.

TABLE 8

| Ingredient | Weight % |
| --- | --- |
| MPA (Propylene glycol methyl ether acetate) | 15-20 |
| Pigment Black 7 (Carbon Black) | 3-9 |
| Disperbyk D167 (Dispersant) | 0.5-1.5 |
| DPMA (Dipropylene glycol mono methyl ether acetate) | 54-62 |
| Glide 415 (Surfactant) | 0.01-0.025 |
| 25% Paraloid B-66 (Copolymer of methyl methacrylate and butyl methacrylate) in DPMA | 10-25 |

The ink prepared in accordance with this example was applied (40 micron thickness) on various substrates such as vinyl, PVC, papers, and plastics. The ink was heated to about 80° C. for about 20 seconds to evaporate solvent. The dried film showed good mechanical properties on these substrates. Further, this black mechanical ink composition has been jetted from a piezoelectric print head manufactured by Scitex Vision Ltd. of Netanya, Israel and jetting properties were tested. No clogging of print-head nozzles was observed, and no misdirected ink was detected even after long periods of continuous printing. It is noted that this black ink composition is also jettable from other print heads, including, for example, GEN-2 print heads manufactured by Ricoh Co., Ltd., Tokyo, Japan.

Example 9

Spot Color Ink Compositions

Pigment dispersions and inks are prepared in accordance with any of Examples 1-8 using spot color pigments, such as Cromophtal Orange GL (PO-64 from Ciba) or Microlith Green G-K (PG 7 from Ciba).

It is noted that in the above ink examples, one of the acrylic resin or the vinyl chloride-vinyl acetate resin is present, or alternatively, both of the acrylic resin and the vinyl chloride-vinyl acetate resin is present. This being noted, it is understood that each of the above described inks is modifiable to include either both types of resin, or to include either type of resin without the other. In other words, the ink examples are merely exemplary, and resin choice and amounts, as well as other component amounts, can be modified accordingly to achieve desired results. Thus, while certain features of the inks have been illustrated and described herein, many modifications, substitutions, changes, and equivalents will now occur to those of ordinary skill in the art. It is, therefore, to be understood that the appended claims are intended to cover all such modifications and changes as fall within the true parameters of the ink.

What is claimed is:

1. An ink composition for ink-jet recording, comprising:
   a non-aqueous HAPS-free solvent system;
   a binder system, including at least one of i) an acrylic resin, or ii) a first vinyl chloride-vinyl acetate resin, said binder system being at least substantially soluble in the solvent system;
   a pigment milled in presence of a second vinyl chloride-vinyl acetate resin and at least one solvent of said solvent system; and
   a solvent soluble dispersant including an ethoxylated-polyurethane block copolymer with aromatic side chains.

2. The ink composition of claim 1, further comprising at least one additive selected from the group of surfactants, wetting agents, dispersants, leveling agents, and preservatives.

3. The ink composition of claim 2, wherein the additive includes a polyether siloxane copolymer surfactant.

4. The ink composition of claim 1, wherein the solvent system includes at least one solvent selected from the group of propylene glycol ethers, glycol ether acetates, ketones, and esters.

5. The ink composition of claim 1, wherein the solvent system includes at least one solvent selected from the group of dipropylene glycol dimethyl ether, tripropylene glycol mono methyl ether, propylene glycol methyl ether, and propylene glycol methyl ether acetate.

6. The ink composition of claim 1, wherein at least one of the first or second vinyl chloride-vinyl acetate resins includes from 60 to 90 wt % vinyl chloride and about 10 wt % to 40 wt % vinyl acetate or vinyl acetate ester.

7. The ink composition of claim 6, wherein at least one of the first or second vinyl chloride-vinyl acetate resins includes carboxyl or hydroxyl functional groups.

8. The ink composition of claim 6, wherein at least one of the first or second vinyl chloride-vinyl acetate resins includes from 0.1 wt % to 2 wt % of dicarbonic acid.

9. The ink composition of claim 6, wherein at least one of the first or second vinyl chloride-vinyl acetate resins includes from 80 to 90 wt % vinyl chloride and about 10 wt % to 20 wt % vinyl acetate or vinyl acetate ester, with or without carboxyl or hydroxyl functional groups.

10. The ink composition of claim 1, wherein at least one of the first or second vinyl chloride-vinyl acetate resins has a weight average molecular weight from about 45,000 Mw to about 60,000 Mw.

11. The ink composition of claim 1, wherein the acrylic resin is present in the ink composition.

12. The ink composition of claim 11, wherein the acrylic resin is a copolymer of methyl methacrylate and butyl methacrylate having a weight average molecular weight from about 50,000 Mw to about 150,000 Mw.

13. The ink composition of claim 1, wherein the acrylic resin and at least one of the first or second vinyl chloride-vinyl acetate resins are present in the ink composition.

14. The ink composition of claim 1, wherein the first or second vinyl chloride-vinyl acetate resin is present and the acrylic resin is not present in the ink composition.

15. The ink composition of claim 1, wherein the first vinyl chloride-vinyl acetate resin and the second vinyl chloride-vinyl acetate resin are the same composition.

16. The ink composition of claim 1, wherein the pigment is also milled in the presence of a glycol ether.

17. The ink composition of claim 16, wherein the glycol ether is dipropylene glycol mono methyl ether acetate.

18. The ink composition of claim 1, wherein the pigment is also milled in the presence of at least one of N-propyl lactate or ethylhexyl lactate.

19. The ink composition of claim 18, wherein the at least one of N-propyl lactate and ethylhexyl lactate is predominantly S-chiral.

20. The ink composition of claim 1, wherein the solvent system further includes an accelerating solvent for reducing drying time.

21. The ink composition of claim 20, wherein the accelerating solvent is dipropylene glycol dimethyl ether.

22. The ink composition of claim 1, wherein the ink composition is cyan, magenta, yellow, or black.

23. The ink composition of claim 1, wherein the ink composition is a spot color.

24. The ink composition of claim 1, wherein the solvent system further comprises N-ethyl-2-pyrrolidone.

25. The ink composition of claim 1, wherein at least one solvent of the solvent system serves as a dispersing and diluent solvent for the ink composition.

26. An ink set comprising at least one ink composition of claim 1.

27. The ink set of claim 26, wherein the at least one ink composition is a spot color.

28. A method of printing an image, comprising ink-jetting an ink composition onto a media substrate, said ink composition comprising:
   a) a non-aqueous HAPS-free solvent system;
   b) a binder system, including at least one of i) an acrylic resin, or ii) a first vinyl chloride-vinyl acetate resin, said binder system being at least substantially soluble in the solvent system;
   c) a pigment milled in presence of a second vinyl chloride-vinyl acetate resin and at least one solvent of said solvent system; and
   d) a solvent soluble dispersant including an ethoxylated-polyurethane block copolymer with aromatic side chains.

29. The method of claim 28, wherein the substrate includes plastic, glass, or metal.

30. The method of claim 29, wherein the substrate is plastic, and is selected from PVC or vinyl.

31. The method of claim 28, wherein the substrate includes paper.

32. The method of claim 28, wherein the ink composition further comprises a polyether siloxane copolymer surfactant.

33. The method of claim 28, wherein the solvent system of the ink composition includes at least one of dipropylene glycol dimethyl ether, tripropylene glycol mono methyl ether, propylene glycol methyl ether, propylene glycol methyl ether acetate, and butyrolactone.

34. The method of claim 28, wherein the first and second vinyl chloride-vinyl acetate resins includes from 60 to 90 wt % vinyl chloride and about 10 wt % to 40 wt % vinyl acetate or vinyl acetate ester, with or without carboxyl or hydroxyl functional groups.

35. The method of claim 34, wherein the first and second vinyl chloride-vinyl acetate resins includes from 80 to 90 wt % vinyl chloride, about 10 wt % to 20 wt % vinyl acetate or vinyl acetate ester, and about 0.1 wt % to 2 wt % of dicarbonic acid, with or without carboxyl or hydroxyl functional groups.

36. The method of claim 28, wherein the first and second vinyl chloride-vinyl acetate resins is present and has a weight average molecular weight from about 45,000 Mw to about 60,000 Mw.

37. The method of claim 28, wherein the acrylic resin is present and is a copolymer of methyl methacrylate and butyl methacrylate having a weight average molecular weight from about 50,000 Mw to about 150,000 Mw.

38. The method of claim 28, wherein both the acrylic resin and the first and second vinyl chloride-vinyl acetate resin are present in the ink composition.

39. The method of claim 28, wherein the first or second vinyl chloride-vinyl acetate resin are present and the acrylic resin is not present in the ink composition.

40. The method of claim 28, wherein the pigment is also milled in the presence of dipropylene glycol mono methyl ether acetate.

41. The method of claim 28, wherein the pigment is also milled in the presence of at least one of N-propyl lactate or ethylhexyl lactate.

42. The method of claim 41, wherein at least one of N-propyl lactate and ethylhexyl lactate is predominantly S-chiral.

43. The method of claim 28, wherein the solvent system further includes dipropylene glycol dimethyl ether for reducing drying time.

44. The method of claim 28, wherein the first vinyl chloride-vinyl acetate resin and the second vinyl chloride-vinyl acetate resin are the same composition.

45. The method of claim 28, wherein at least one solvent of the solvent system serves as a dispersing and diluent solvent for the ink composition.

46. An ink composition for ink-jet recording, comprising:
a non-aqueous HAPS-free solvent system;
a binder system, including at least one of i) an acrylic resin, or ii) a first vinyl chloride-vinyl acetate resin, said binder system being at least substantially soluble in the solvent system;
a pigment milled in presence of a second vinyl chloride-vinyl acetate resin,, at least one solvent of said solvent system, and at least one predominantly S-chiral of N-propyl lactate or predominantly S-chiral ethylhexyl lactate.

47. A method of printing an image, comprising ink-jetting an ink composition onto a media substrate, said ink composition comprising:
a) a non-aqueous HAPS-free solvent system;
b) a binder system, including at least one of i) an acrylic resin, or ii) a first vinyl chloride-vinyl acetate resin, said binder system being at least substantially soluble in the solvent system;
c) a pigment milled in presence of a second vinyl chloride-vinyl acetate resin, at least one solvent of said solvent system, and at least one predominantly S-chiral N-propyl lactate or predominantly S-chiral ethylhexyl lactate.

* * * * *

UNITED STATES PATENT AND TRADEMARK OFFICE
CERTIFICATE OF CORRECTION

| | | |
|---|---|---|
| PATENT NO. | : 7,726,799 B2 | Page 1 of 1 |
| APPLICATION NO. | : 11/490574 | |
| DATED | : June 1, 2010 | |
| INVENTOR(S) | : Efrat Soroker et al. | |

It is certified that error appears in the above-identified patent and that said Letters Patent is hereby corrected as shown below:

In column 14, line 8, in Claim 46, delete "resin,," and insert -- resin, --, therefor.

Signed and Sealed this
Fourteenth Day of June, 2011

David J. Kappos
*Director of the United States Patent and Trademark Office*